(12) United States Patent
Lobbato

(10) Patent No.: US 11,900,447 B2
(45) Date of Patent: Feb. 13, 2024

(54) FURNISHING SELECTION SYSTEM

(71) Applicant: Inter IKEA Systems B.V., Delft (NL)

(72) Inventor: Alexander Lobbato, Frederiksberg (DK)

(73) Assignee: INTER IKEA SYSTEMS B.V., Delft (NL)

( * ) Notice: Subject to any disclaimer, the term of this patent is extended or adjusted under 35 U.S.C. 154(b) by 4 days.

(21) Appl. No.: 17/141,048

(22) Filed: Jan. 4, 2021

(65) Prior Publication Data

US 2022/0215462 A1 Jul. 7, 2022

(51) Int. Cl.
*G06Q 30/06* (2023.01)
*G06Q 30/0601* (2023.01)
*G06F 30/13* (2020.01)
*G06K 7/10* (2006.01)
*G06Q 20/32* (2012.01)
*G06K 7/14* (2006.01)

(52) U.S. Cl.
CPC ........ *G06Q 30/0643* (2013.01); *G06F 30/13* (2020.01); *G06K 7/1095* (2013.01); *G06Q 20/3276* (2013.01); *G06Q 30/0633* (2013.01); *G06K 7/1417* (2013.01)

(58) Field of Classification Search
CPC ........... G06Q 30/0643; G06Q 30/0633; G06Q 20/3276
USPC ...................................................... 705/26.8
See application file for complete search history.

(56) References Cited

U.S. PATENT DOCUMENTS

| | | | | |
|---|---|---|---|---|
| 5,664,231 A * | 9/1997 | Postman | ................. | G06F 3/002 235/462.49 |
| 8,296,477 B1 * | 10/2012 | Polk | ....................... | G06Q 99/00 710/16 |
| 8,353,448 B1 * | 1/2013 | Miller | ................ | G06Q 20/3276 235/379 |
| 8,418,919 B1 * | 4/2013 | Beyda | .................... | G06Q 20/20 235/487 |
| 11,520,949 B2 * | 12/2022 | Reynolds | ................ | G06F 30/27 |
| 2001/0047250 A1 | 11/2001 | Schuller et al. | | |
| 2007/0161402 A1 | 7/2007 | Ng et al. | | |
| 2009/0182566 A1 * | 7/2009 | Bhogal | ............. | G06Q 30/0281 705/346 |

(Continued)

FOREIGN PATENT DOCUMENTS

| | | | |
|---|---|---|---|
| CN | 108510597 A | 9/2018 | |
| CN | 109564351 A | 4/2019 | |
| WO | WO-0215062 A2 * | 2/2002 | ........... G06K 7/1095 |

OTHER PUBLICATIONS

Article, "Global Retail Industry Innovations Explored in New Retailing Reports", PR Newswire [New York] Feb. 12, 2015; retrieved from Dialog database on Jun. 30, 2022 (Year: 2015).*

(Continued)

*Primary Examiner* — Yogesh C Garg

(74) *Attorney, Agent, or Firm* — Nixon & Vanderhye, P.C.

(57) ABSTRACT

A furnishing selection system provides a furniture layout design application to generate a virtual room with selected furnishings. Information can then be transferred from the furniture layout design application to a personal device. A machine-readable code is generated, which can be scanned by the personal device to transfer the information. After the information is transferred a purchase is completed of one or more products from the selected furnishings.

21 Claims, 21 Drawing Sheets

(56) References Cited

U.S. PATENT DOCUMENTS

| | | | | |
|---|---|---|---|---|
| 2009/0305675 | A1* | 12/2009 | Mueller | H04L 51/066 455/412.1 |
| 2011/0215146 | A1* | 9/2011 | Shams | G06K 15/00 235/462.07 |
| 2012/0190386 | A1* | 7/2012 | Anderson | H04L 67/306 455/456.3 |
| 2012/0203605 | A1 | 8/2012 | Morgan et al. | |
| 2014/0132633 | A1* | 5/2014 | Fekete | G06Q 50/01 345/634 |
| 2014/0249903 | A1* | 9/2014 | Preston | G06Q 30/0222 705/14.23 |
| 2014/0365341 | A1 | 12/2014 | MacLaurin et al. | |
| 2015/0088731 | A1* | 3/2015 | Ackerman | G06Q 10/0836 705/39 |
| 2015/0228004 | A1* | 8/2015 | Bednarek | G06Q 30/0633 705/26.8 |
| 2017/0011558 | A1 | 1/2017 | Meier et al. | |
| 2018/0308187 | A1* | 10/2018 | Rotem | G06F 3/0482 |
| 2019/0082297 | A1* | 3/2019 | Poda | H04W 4/024 |
| 2019/0188915 | A1 | 6/2019 | Meier et al. | |
| 2020/0394481 | A1* | 12/2020 | Brandt | G06K 19/06075 |

OTHER PUBLICATIONS

PCT International Search Report and Written Opinion for PCT Application No. PCT/EP2021/086429 dated Apr. 8, 2022 (12 pages).
Izadinia, Hamid; 2017 IEEE Conference on Computer Vision and Pattern Recognition (CVPR); IM2CAD; Jul. 21, 2017, pp. 2422-2431.

* cited by examiner

FURNISHING SELECTION SYSTEM

BACKGROUND

Generally, customers of furnishing products visit a store to view and select products. The customers may look at products or displays of products and make decisions on which products they are interested in.

Alternatively, customers of furnishing products may view products on a website. The website shows images and/or videos of the different products. In some of the images and/or videos the products may be shown in the context of a scene or in a room. After viewing the products and the associated images and/or videos a customer makes a decision on whether they are interested in purchasing the products.

Some customers may seek the advice of friends, family or design experts before making a purchase using one of the methods describe above. Other customers may hire a design expert to make furnishing purchases on behalf of the customer.

SUMMARY

In general terms, this disclosure is directed to a furnishing selection system. In some embodiments, and by non-limiting example, a furniture layout design application is provided to generate a virtual room with selected furnishings. Information can then be transferred from the furniture layout design application to a personal device. After the information is transferred a purchase of one or more products from the selected furnishings is completed.

One aspect is a kiosk comprising: a kiosk housing; a display device coupled to the kiosk housing and visible from outside of the kiosk housing; and a computing device contained in the kiosk housing and including a memory storage device, the memory storage device storing data instructions that, when executed by the computing device, cause the computing device to: generate and display on the display device a graphical user interface for a furniture selector application; receive inputs from a user selecting one or more furniture products; generate a list of products identifying the one or more furniture products; generate a machine-readable code encoding the list of products; and display the machine-readable code on the display device such that the machine-readable code is scannable by a camera of a user device to transfer the list of products to the user device.

Another aspect is a method of selecting products from a store, the method comprising: generating and displaying a graphical user interface for a furniture selector application on a display device; receiving inputs from a user selecting one or more furniture products; generating a list of products identifying the furniture products; encoding the list of products into a machine-readable code; displaying the machine-readable code on the display device; and transferring the list of products to a user device using the machine-readable code.

A further aspect is a user computing device comprising: a camera; a display device; a processing device; and a memory storage device storing data instructions that, when executed by the processing device, cause the user computing device to: scan a machine-readable code; decode the machine-readable code to determine a list of products, wherein the list of products was generated using a furniture design application on the user computing device; display the list of products on the display device; and initiate a checkout process to process a purchase of one or more products from the list of products.

DETAILED DESCRIPTION

Figure 1:
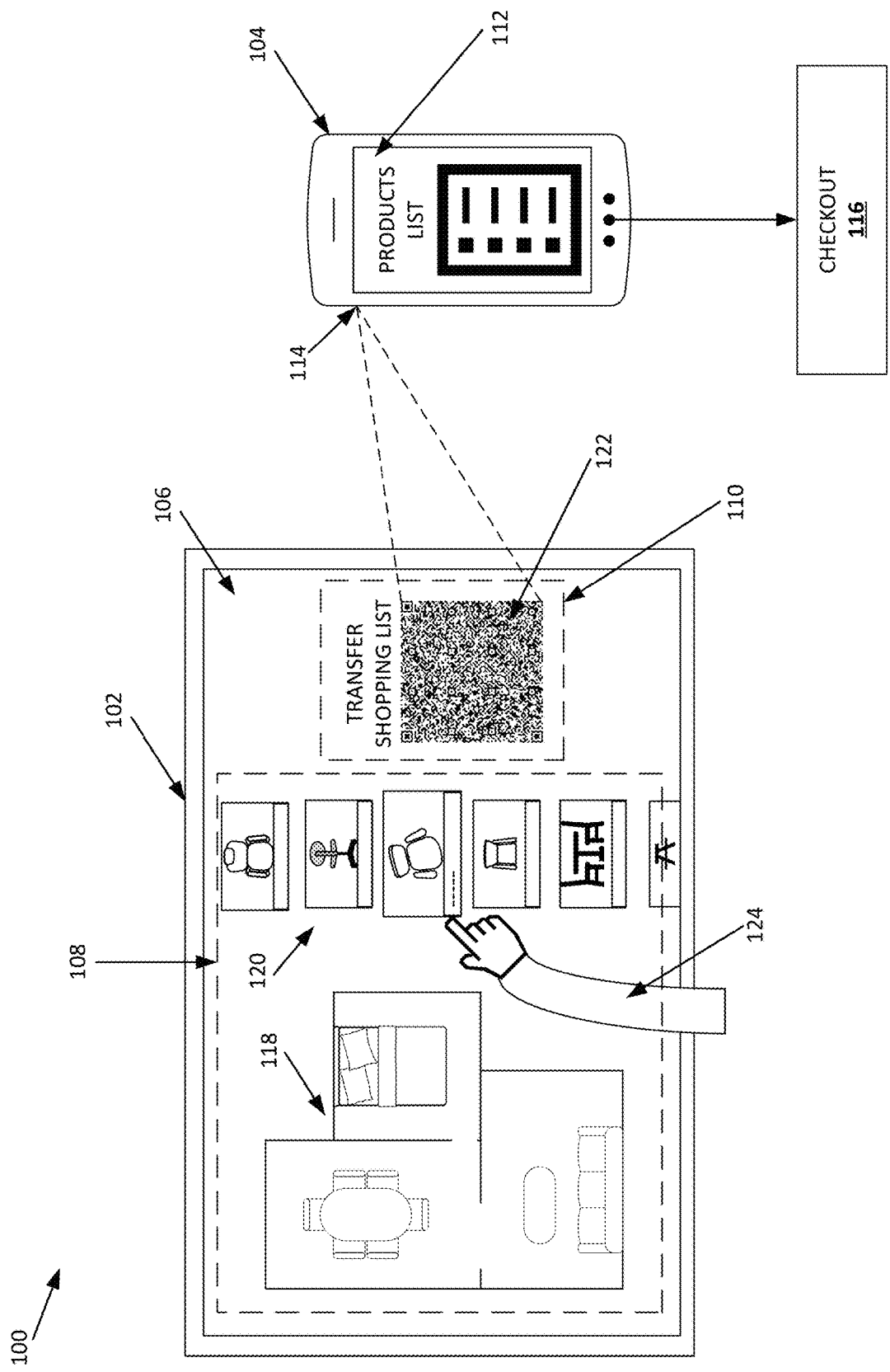
FIG. 1 is a schematic diagram illustrating an example furniture selection system according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to a furnishing selection system. Furnishings includes products which can be placed or installed in a room. For example, furnishings include home furniture, bedroom furniture, kitchen furniture, living room furniture, office furniture, and any other type of furniture. Furnishings also include various appliances which can be placed in rooms. Additionally, furnishings include room décor, exercise equipment, fixtures, and the like.

Many of the embodiments disclosed herein refer to an example in which furniture is selected. As noted above, furniture is just one example of furnishings. Accordingly, the examples described herein that make reference to furniture or furniture selection are equally applicable to other furnishings and furnishing selections. Accordingly, the methods and systems disclosed herein are applicable to all types of furnishings.

FIG. 1 is a schematic diagram illustrating an example furniture selection system 100. In this example, the furniture selection system 100 includes a computing device 102 and a user computing device 104. The computing device 102 includes a display device 106, a furniture layout designer 108, and a machine-readable code generator 110. The furniture layout designer 108 includes a room editor 118 and a furniture selector 120. The machine-readable code generator 110 generates a machine-readable code 122. The user computing device 104 includes a display 112, a camera 114, and a checkout module 116. Also shown in FIG. 1 is a user 124.

In this example, the furniture selection system 100 includes a computing device 102 and a user computing device 104.

The computing device 102 can be used by a user 124 to select and arrange furniture items to create a display of the furniture items in a sample room. After the user 124 completes a selection and placement of furniture the computing device 102 can generate a list of the selected furniture. The computing device 102 can include a connection to a network and an external server. The external server can include a database with a list of products and corresponding prices and inventory information.

Next, the computing device 102 can transfer the list of the selected furniture to the user computing device 104. The user computing device 104 can be any computing device which can receive the list of selected furniture from the computing device 102. In some examples, the user computing device 104 can be a mobile computing device, such as a smart phone or a tablet, belonging to the user 124. The user 124 uses the user computing device 104 to complete the purchase of one or more furniture items in the transferred list of selected furniture. The user 124 can also use the user computing device 104 to send furniture design layout information to other computing devices.

In the example shown, the computing device includes a display device 106, a furniture layout designer 108, and a machine-readable code generator 110.

The display device 106 can be any type of electronic display including a touchscreen, monitor, television, projector, or a virtual reality headset. In the example shown, the display device 106 is a touch screen. Examples of different user-faces displayed on the display device are illustrated and described in reference to FIGS. 10-12.

The display device 106 displays the furniture layout designer 108. The furniture layout designer 108 is used to create example displays with furniture items in sample rooms. Examples of the furniture layout designer 108 are illustrated and described in further detail herein with reference to FIG. 4.

The furniture layout designer 108 determines a list of furniture which is transferred to the machine-readable code generator 110. The machine-readable code generator 110 encodes the list of selected furniture and any additional session information into a machine-readable code 122. Once the machine-readable code 122 is generated it is displayed on the display device 106.

In some embodiments, the furniture layout designer 108 includes a room editor 118 and a furniture selector 120.

The room editor 118 allows the user to edit features within a room, such as editing the arrangement of furniture pieces, characteristics of the furniture pieces, and characteristics of the room.

The furniture selector 120 allows a user to select furniture pieces from a catalog of furniture pieces. The selected furniture pieces may be placed by the user 124 in the sample room displayed in the room editor 118.

The machine-readable code generator 110 generates a machine-readable code 122. The machine-readable code generator 110 encodes a list of products to generate the machine-readable code 122. The list of products can be received from the furniture layout designer 108. The machine-readable code generator 110 can also encode other information from the furniture layout designer 108. The machine-readable code 122 can be any code which can be processed by a computer and is not easily readable by humans. Examples of the machine-readable code 122 include bar codes and QR codes. An example of the machine-readable code generator 110 is described and illustrated in reference to FIG. 9.

The user computing device 104 includes a display 112, a camera 114, and a checkout module 116. The user computing device 104 is further described and illustrated in reference to FIG. 13.

The camera 114 can capture the machine-readable code 122. In other embodiments the user computing device 104 can include other sensors capable of capturing the machine-readable code, such as a scanner.

The user computing device 104 can decode the machine-readable code 122 captured by the camera 114 and display a list of products on the display 112, or other information related to the purchase of one or more products in the list of products.

The user computing device 104 includes a checkout module 116 which can prompt the user to complete a purchase of the list of furniture. Example methods for checking out are described in reference to FIGS. 17-18.

Figure 2:
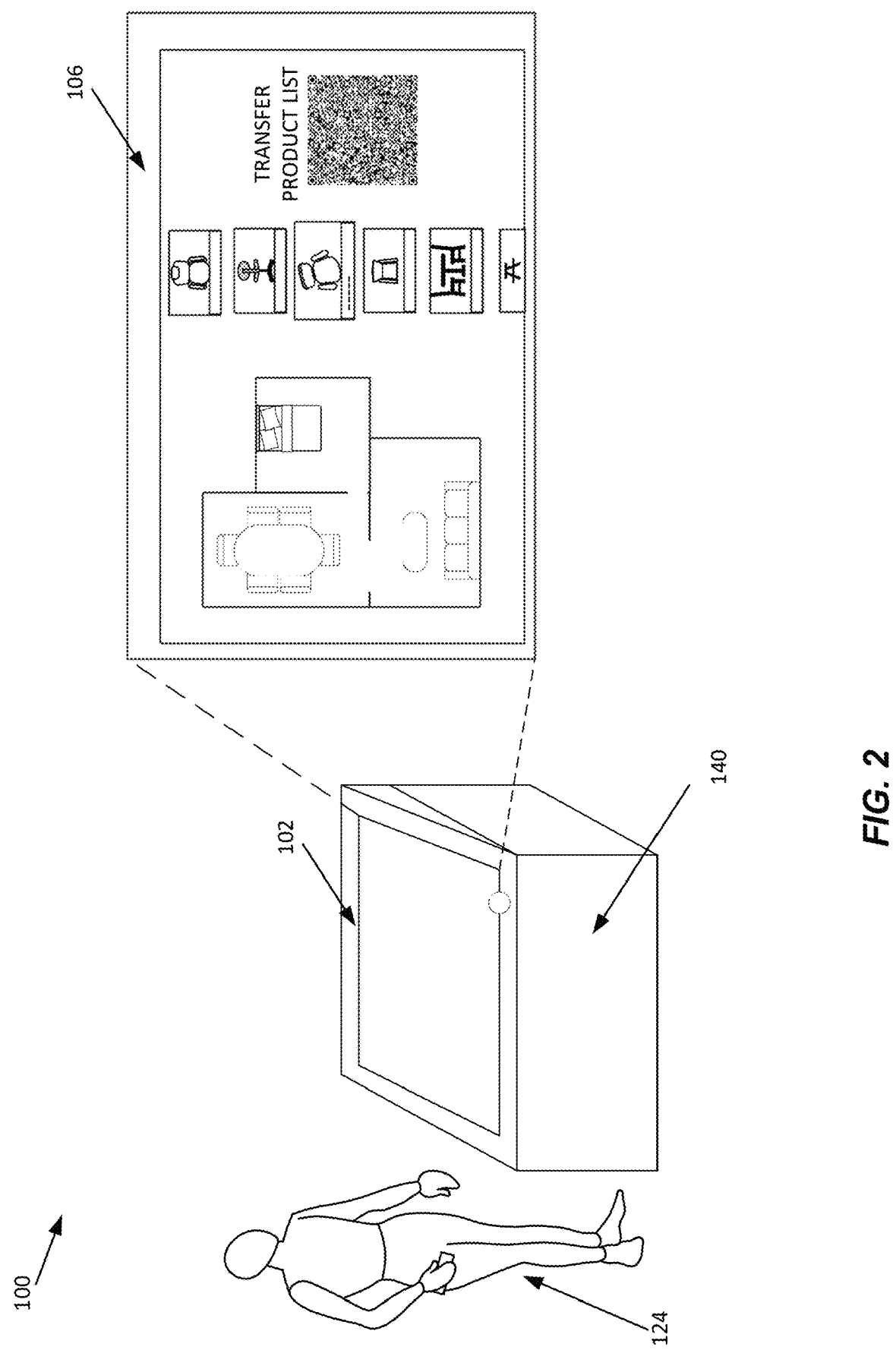
FIG. 2 is a schematic diagram illustrating an example furniture selection system.

FIG. 2 is a schematic diagram illustrating another example of the furniture selection system 100, shown in FIG. 1. In this example, the furniture selection system 100 includes a kiosk 140. The example kiosk 140 includes a kiosk housing 142, the computing device 102, and the display device 106. Also shown in FIG. 2 is a user 124.

In this example, the furniture selection system 100 includes a kiosk 140. In one example, the kiosk includes custom-made hardware and software that allows customers to explore a range of products in a virtual room. In some embodiments the kiosk 140 is placed inside a store and is usable by the user 124. In some examples, the user 124 is one or more customers in a store. The user 124 can also be one or more employees of the store. Users of the kiosk 140 can include any combination of customers, employees, professional designers, or any other person interested in designing room furnishings. In some examples, the kiosk 140 is located in a store and presents products which are sold at the store. The kiosk 140 can also be located outside of a store. For example, the kiosk 140 could be located in a mall and contain product information related to a nearby store.

In this example, the kiosk 140 includes a computing device 102, a kiosk housing 142, and a display device 106.

The computing device 102 can be used by a user 124 to select and arrange furniture items to create a display of the furniture items in a sample room. An example of a computing device 102 is illustrated and described in more detail with reference to FIG. 1.

The display device 106 can be any type of electronic display including a touchscreen, monitor, television, or projector. In the example shown, the display device 106 is a touch screen. In other embodiments the computing device 102 is coupled with controls which allow the user to interact with the furniture layout designer. The display device 106 is visible from outside the kiosk 140.

The kiosk housing 142 embeds the computing device 102 and the display device 106. In the example shown, the kiosk housing 142 embeds the display device at a level which is convenient for use by the user 124. For example, the kiosk housing 142 may embed the display device 106 so a user can view and interact with the display device 106 without sitting down or bending over. Additionally, the kiosk housing 142 may provide structure and support so that the user 124 can interact with the furniture selection system 100 without moving the kiosk 140.

Figure 3:
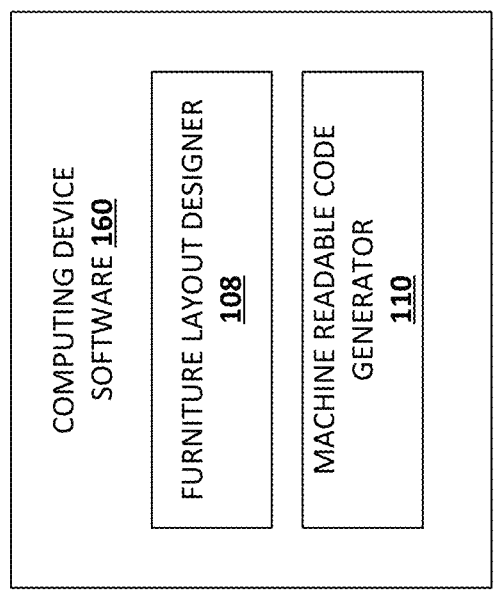
FIG. 3 is a schematic block diagram of a computing device software.

FIG. 3 is a schematic block diagram of a computing device software 160. The computing device software 160 includes the furniture layout designer 108 and the machine-readable code generator 110. In some examples the computing device software 160 is executed on a computing device 102 which is part of kiosk 140, as shown in the example of FIG. 2.

In some embodiments, the computing device software 160 includes a furniture layout designer 108. The furniture layout designer 108 is used to create example displays with furniture items in sample rooms. The furniture layout designer 108 determines a list of furniture which is transferred to the machine-readable code generator 110. Further details regarding an exemplary furniture layout designer are discussed below in reference with FIG. 4.

In some embodiments, the computing device software 160 includes a machine-readable code generator 110 that encodes the list of selected furniture and any additional session information into a machine-readable code. Examples of the machine-readable code generator 110 are illustrated and discussed in further detail below in reference to FIG. 9.

Figure 4:
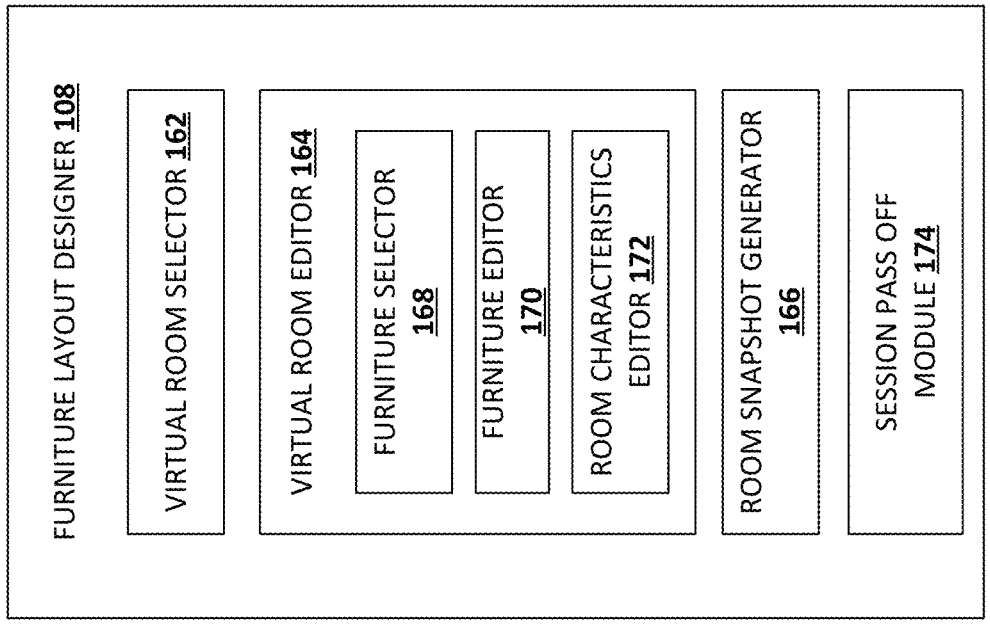
FIG. 4 is a schematic block diagram of a furniture layout designer.

FIG. 4 is a schematic block diagram of a furniture layout designer 108. The furniture layout designer 108 includes a virtual room selector 162, a virtual room editor 164, a room snapshot generator 166, and a session pass off module 174. The virtual room editor 164 includes a furniture selector 168, a furniture editor 170, and a room characteristics editor 172.

Figure 10:
FIG. 10 is an example room selector user-interface.

In some embodiments the furniture layout designer 108 includes a virtual room selector 162. The virtual room selector 162 allows a user to select a room to design. Using the virtual room selector 162 a user can select a room or a set of rooms that emulates the space the user is interested in designing. The virtual room selector 162 can include a predefined list of rooms or allow the user to enter customized rooms. In some embodiments, the virtual room selector 162 can contain a list of room types. Examples of room types include, living room bedroom, kitchen, office space, restaurant or any other room where furnishings can be placed. An example of a virtual room selector 162 user interface is shown in FIG. 10.

In some embodiments the furniture layout designer 108 includes a virtual room editor 164. The virtual room editor 164 includes a furniture selector 168, a furniture editor 170, and a room characteristics editor 172. In one example, the virtual room editor 164 allows a user to edit a virtual room by furnishing, moving, pivoting, and selecting different products, models, and colors. An example virtual room editor 164 user-interface is described below in reference with FIG. 11.

The furniture selector 168 contains functionality to allow a user to select furniture from a furniture catalog. In some embodiments, the catalog is retrieved from a remote database. The catalog contains a list of furniture products. The catalog can also contain inventory information of the furniture in a store associated with the kiosk. The catalog can also contain pricing information for the furniture products.

The furniture editor 170 allows a user to place, swap, orientate furniture within the virtual room. The furniture editor 170 can also allow a user to edit furniture characteristics. For example, the furniture editor 170 can include making modifications to furniture color, size, or materials.

The virtual room editor 164 allows a user to edit characteristics of the room using the room characteristics editor 172. The room characteristics editor 172 allows a user to edit characteristics to create a customized room. For example, a user can modify the wall and floor color. The room characteristics editor can also allow a user to modify the dimensions of the virtual room.

In some embodiments the furniture layout designer 108 includes a room snapshot generator 166. The snapshot generator allows the user to view the room from different viewpoints and different lighting settings and then generates snapshots of the room. The room snapshot generator 166 can also link the snapshot to furniture products in the snapshot. These images can be passed off to a user device using the session pass off module 174. In some examples the snapshot generator may generate a video clip which explores a virtual room designed by a user. An example a room snapshot generator 166 user-interface is described below in reference with FIG. 11.

Figure 5:
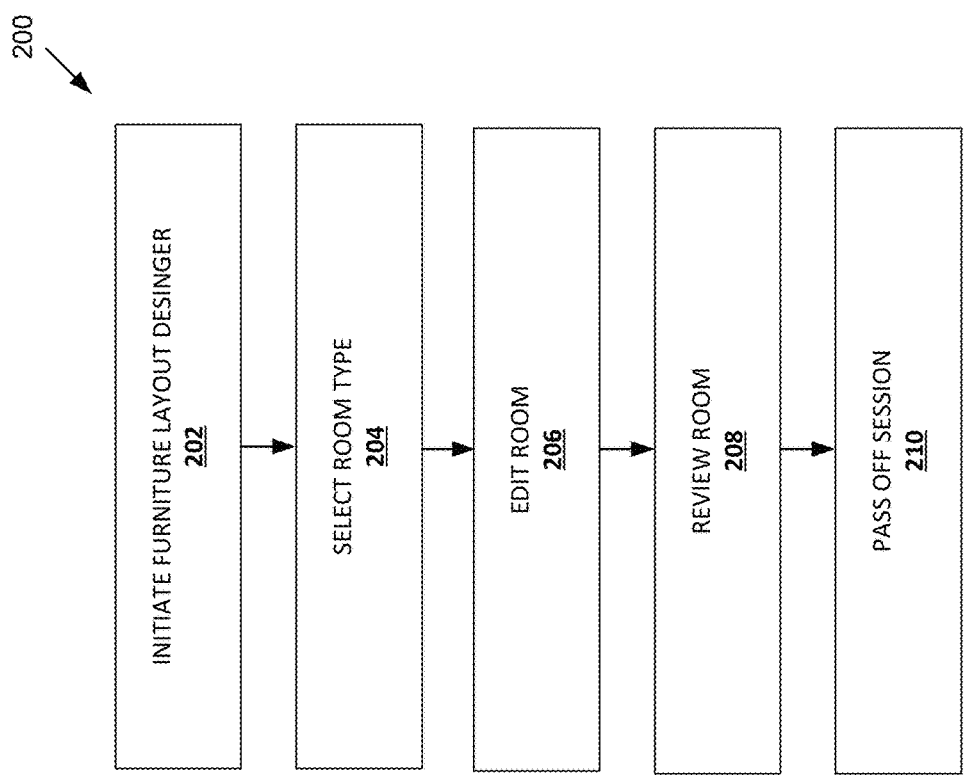
FIG. 5 is a flow chart illustrating an example method of selecting furniture.

In some embodiments the furniture layout designer 108 includes a session pass off module 174. The session pass off module 174 creates a list of products and/or images which is set to transfer to a user device. The list of products and/or images which are set to transfer to a user device are sent to an encoder. Examples of session information which the session pass off module 174 can compile for the encoder are illustrated and described in FIG. 9;

FIG. 5 is a flow chart illustrating an example method 200 of selecting furniture. In this example, the method 200 includes operations 202, 204, 206, 208, and 210.

The operation 202 initiates the furniture layout designer 108. In some examples the operation 202 may include presenting a screensaver which is intended to attract customers by showing a highlight reel of what is possible using the furniture layout designer 108. A user can select a user interface to imitate the furniture layout designer.

The operation 204 operates to select a room. In some examples, a user selects a room form a predefined list of room types. For example, a user-interface can present five different room types a user can select. In some examples, the different room types may each include different starting points. A starting point may include preselected furniture presented in the room in a predefined arrangement. In some examples, a user can select different room types and different starting points. For example, each room can have three different starting points, a user can select one of five different rooms and one of the three different starting points for that room. In other embodiments the user may create a customized room. The operation 204 can be performed by the virtual room selector 162 described in reference to FIG. 4.

The operation 206 operates to edit the room. Editing a room includes making modifications to the room's characteristics. Selecting products to place in the room. Moving furniture in the room by orientation or location. Editing the room can also include editing characteristics of the products.

For example, the color or material of a product can be modified. One example for the operation 206 is illustrated and described in FIG. 6. The operation 206 can be performed by the virtual room editor 164 described in FIG. 4.

The operation 208 comprises reviewing a room after the room is edited. A user can review a room by viewing different snapshots. The snapshots are displayed on the display device 106, as shown in the example of FIG. 1. The operation 208 displays snapshots generated by the room snapshot generator 166, as shown in FIG. 4. A list of products which are displayed in the room can also be displayed while the user reviews the virtual room. One example for the operation 208 is illustrated and described in FIG. 7.

The operation 210 is a pass off session which compiles the information of the user's session and provides the information to a machine-code generator. Details of the information provided to the machine-code generator are illustrated and described in FIG. 8. The pass off session can also reset a session. In one example, the pass off session of operation 210 can retrieve user-input indicating that the user is done using the furniture layout designer. The operation can ensure that the session information is removed from the computing device. Users may wish that their selections and arrangements remain private, or removed from the computing device, after a session. For example, the operation 210 removes session information by receiving input indicating that a session is terminated or timing out a session after a set period.

Figure 6:
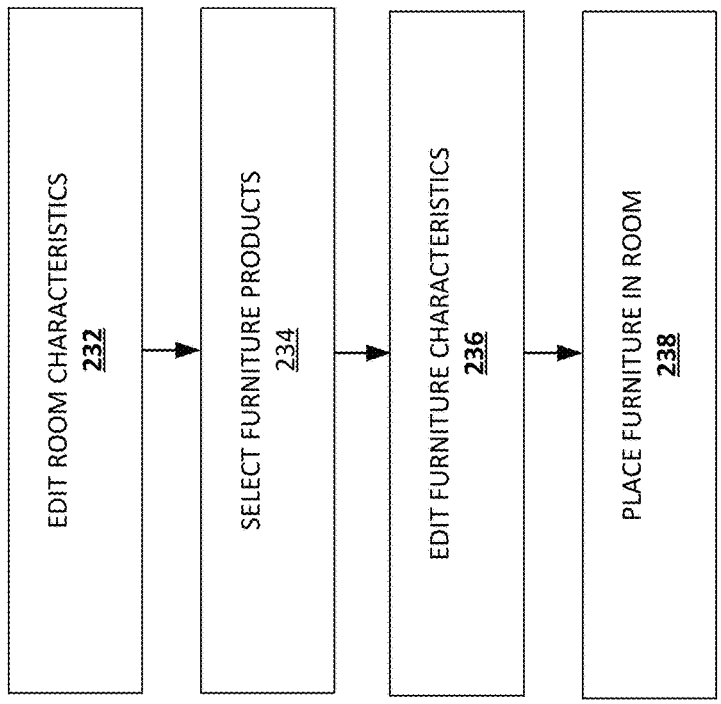
FIG. 6 is a flow chart illustrating an example method for editing a virtual room.

FIG. 6 is a flow chart illustrating an example method 206 for editing a virtual room which is another example of the operation 206 shown in FIG. 5. In this example, the method 206 includes operations 232, 234, 236, and 238.

The operation 232 edits room characteristics. In one example, the kiosk 140, shown in FIG. 2, can receive inputs from a user which edit or modify characteristics of a room. Room characteristics include color the walls and floors, dimensions of the room, window or door placement in a room, and any other characteristics of a physical room.

The operation 234 selects furniture products. In one example, the kiosk 140, shown in FIG. 2, can receive inputs from a user which selects furniture products. In one example, the furniture products may be displayed in a scrollable list which allows a user to select which item is of interest. In some embodiments, the room may already include furniture items in predefined locations, a user can select an item of interest which will open a catalog of products in the same category which a user can select to swap the products. For example, a room may include a bed and a user can select the bed and the system will provide a list of bed products. A user can then select a bed product from the list which will swap the furniture items. A person of ordinary skill in the art will recognize that such a system can provide a catalog of products to a user using different methods of organization and presentation all of which are included in the present disclosure.

The operation 236 edits furniture characteristics. In one example, the kiosk 140, shown in FIG. 2, can receive inputs from a user which edits furniture characteristics. Furniture characteristics can include color of the furniture, material of the furniture, size of the furniture. For example, a user can modify a bed to select different sizes such as king, queen, standard or twin. A user can also select material of the bed such as oak or maple. Additionally, a user can select a paint color for a selected product. There are many different characteristics for different products all of which are included in this disclosure.

The operation 238 operates to place furniture in a room. In one example, the kiosk 140, shown in FIG. 2, receives inputs from a user which places the selected furniture item in a room. Placing the products includes placing the product in particular location in the virtual room and orienting the product. In some examples, the operation 238 includes layering products. For example, the operation 238 may include layering a bed on top of a bed frame with a layer of bedding products, (for example, a comforter and pillows) on top of the bed.

Figure 7:
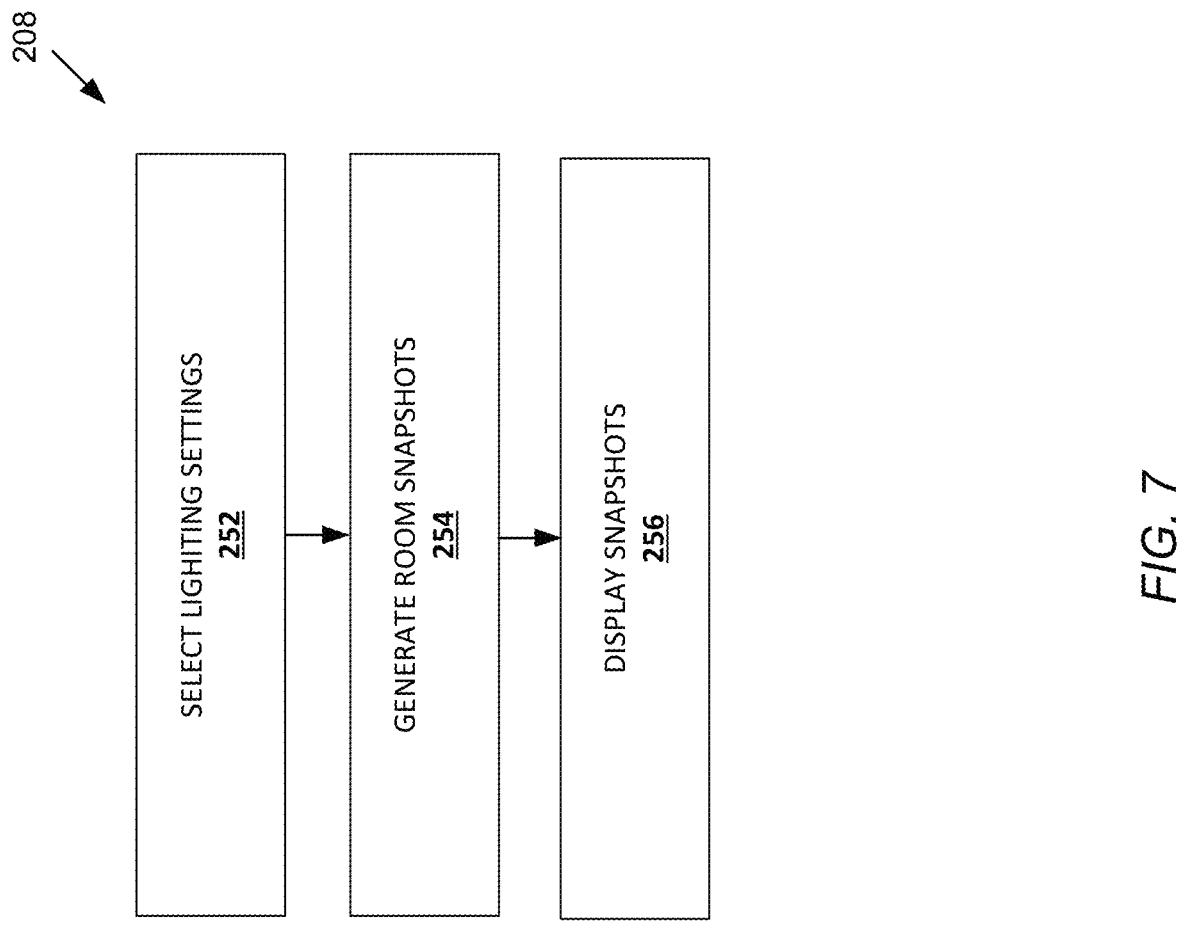
FIG. 7 is a flow chart illustrating an example method 208 for reviewing a room.

FIG. 7 is a flow chart illustrating an example method 208 for reviewing a room, which is another example of the operation 208 shown in FIG. 5. In this example the method 208 includes operations 252, 254, and 256.

The operation 252 selects lighting settings. In one example, the kiosk 140, shown in FIG. 2, receives inputs from a user which modify the lighting settings in a room. A user can view the designed room at different lighting settings such as daytime lighting, night time lighting, or different lighting arrangements in the room.

The operation 254 generates room snapshots. In one example, the furniture layout designer 108 automatically creates snapshots of a room at various angles in the room. In another, example a kiosk 140, as shown in FIG. 2, receives inputs from a user indicating one or more angles and locations to take snapshots of the room.

Figure 12:
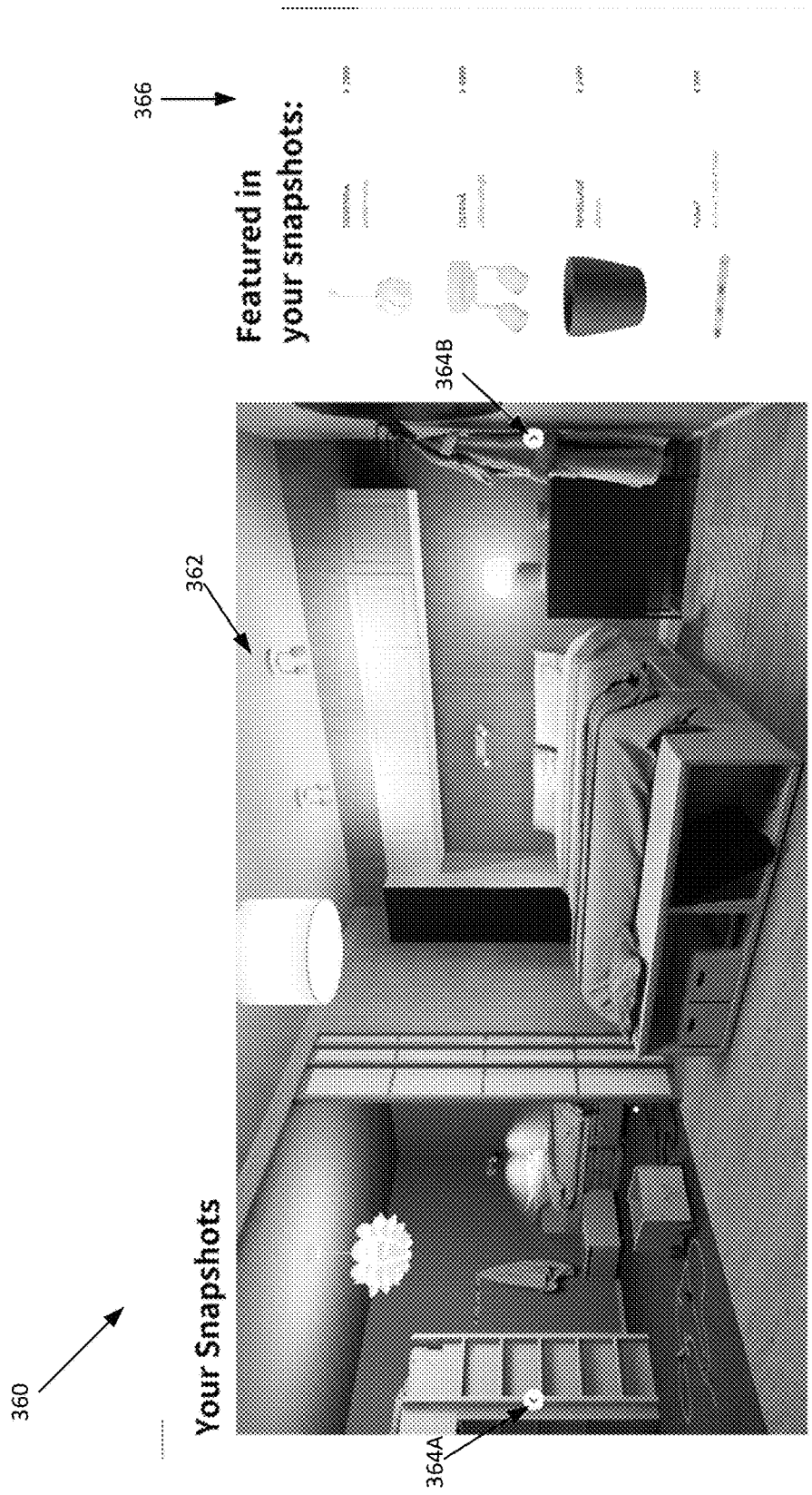
FIG. 12 is an example room reviewer user interface.

The operation 256 displays the room snapshots. The operation 256 can include generating a user interface which allows a user to explore a slideshow of snapshots and indicators for different products present in the snapshots. The operation 256 can also display a list of products present in the snapshots. An example user interface for displaying snapshots is illustrated in FIG. 12.

Figure 8:
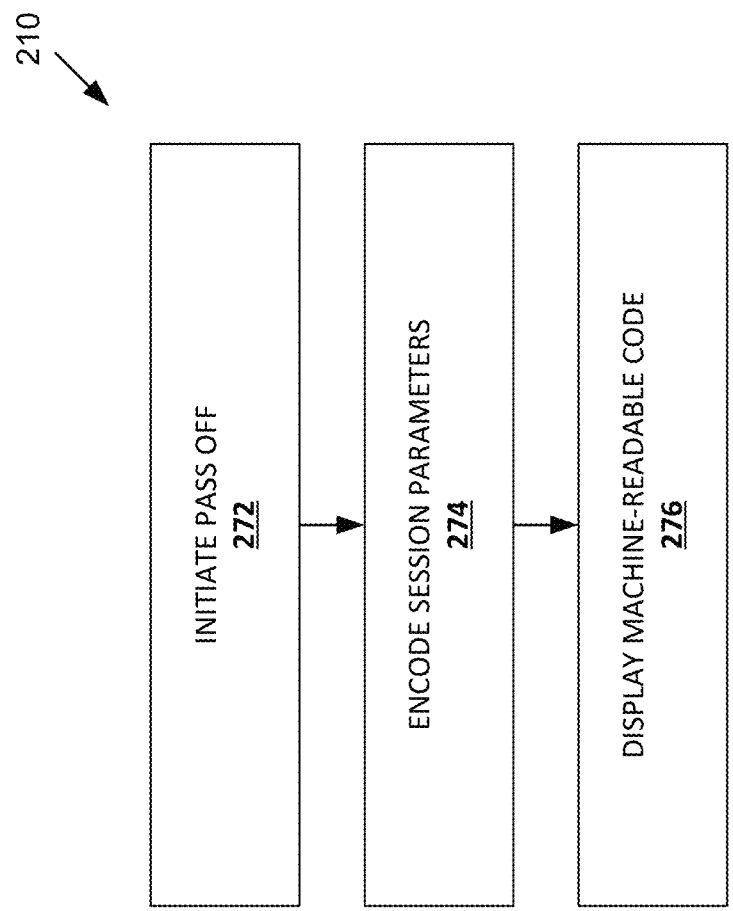
FIG. 8 is a flow chart illustrating an example method for passing off a furniture design session.

FIG. 8 is a flow chart illustrating an example method 210 for passing off a furniture design session, which is another example of the operation 210 as illustrated in FIG. 5. The method 210 includes the operations 272, 274, and 276.

The operation 272 initiates a pass off of a design session. In one example the operation 272 is triggered by a user selecting an interface to indicate they have completed their room design. In another example, the operation 272 is automatically triggered whenever a user makes a modification, in a manner that the method 210 is updated in real time to reflect changes. In other examples the operation 272 is triggered at certain times.

The operation 274 encodes the session parameters into a machine-readable code. An example for the processes for encoding a session is described in detail in FIG. 9.

The operation 276 displays the machine-readable code. After the session parameters are encoded in a machine-readable code the operation 276 displays the machine-readable code on the display device 106, as shown in the example of FIG. 1.

Figure 9:
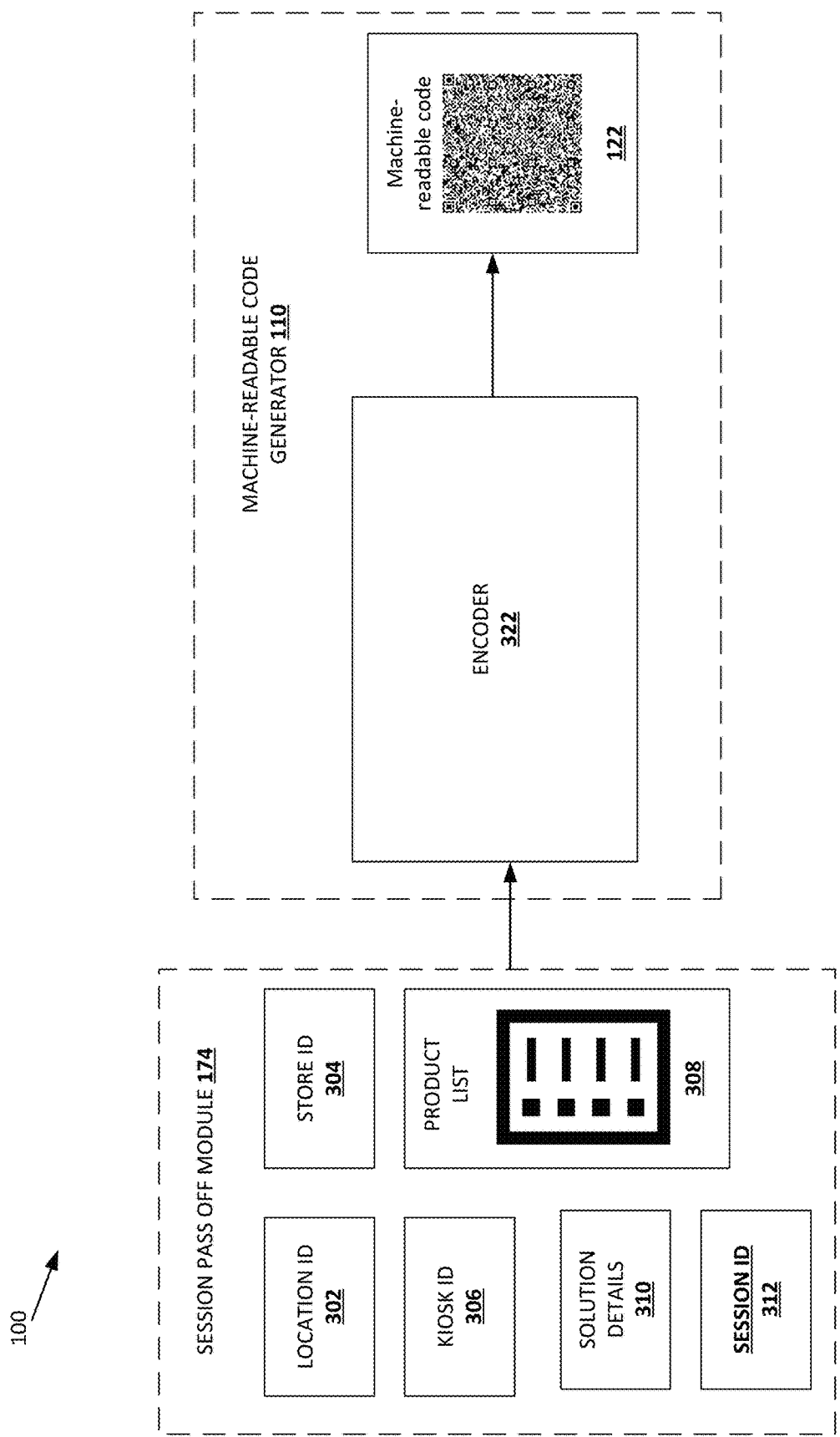
FIG. 9 is a schematic block diagram of another example furniture selection system.

FIG. 9 is a schematic block diagram of another example furniture selection system 100. In this example, the furniture selection system includes a session pass off module 174 and a machine-readable code generator 110. The pass off module includes a location ID 302, a store ID 304, a kiosk ID 306, a products list 308, solution details 310, and a session ID 312. The machine-readable code generator 110 includes an encoder 322 and a machine-readable code 122.

The session pass off module 174 compiles information from a furniture layout design session which is then passed off to the machine-readable code generator 110. The session pass off module 174 includes a location ID 302, a store ID 304, a kiosk ID 306, a products list 308, solution details 310, and a session ID 312.

In some examples, the session pass off module 174, can provide a location ID 302. The location ID 302 may include information about the location of the computing device 102 which is running the furniture layout designer 108.

In some examples, the session pass off module 174, can provide a store ID 304. The store ID provides information about the store the computing device 102 is located in. The store ID 304 can be associated with a reference ID for the specific store. In some examples, the store ID 304 may include information about the stores name. In some examples, the store ID 304 includes information about the store's location or is associated with the location ID 302.

In some embodiments, the session pass off module 174 can provide a kiosk ID 306. The kiosk ID 306 can contain information about the kiosk 140, as shown in the example of FIG. 2. Examples of this information includes the model of the kiosk 140, the location of the kiosk 140 within a store, the type of programs run on the computing device 102, or any other information associated with the kiosk 140.

In some examples, the session pass off module 174 provides a products list 308. The products list 308 includes the list of products which are displayed in the one or more virtual rooms. In some embodiments the products list 308 can contain pricing and inventory information associated with each product. The products list 308 can also contain the location information of the products in the associated store.

The session pass off module 174 provides solution details 310. The solution details 310 can include information about the application which is used to create the products list 308. For example, the solution details 310 can include the furniture layout design application name and/or the version which created the products list 308.

In some examples the session pass off module 174 includes a session ID 312. The session ID 312 is created when a user starts a furniture design session. In some embodiments, the session is uploaded to a cloud service from a kiosk 140. The user then retrieves the session using the session ID 312. In one example, the session pass off module 174 may only provide the session ID 312 to the encoder while the other information of the session is uploaded to the cloud. In another embodiment, the session pass off module 174 includes a combination of information which is given to the encoder including the session ID 312.

In some examples the session pass off module 174 includes other session details. Examples of other possible details includes whether the session was assisted by an employee. This information may allow the furniture selection system 100 to create insights on the impact of employee assisted sessions.

The example furniture selection system 100 includes a machine-readable code generator 110. The machine-readable code generator 110 includes an encoder 322 and a machine-readable code 122.

The encoder 322 generates a machine-readable code 122. The encoder 322 receives information from the session pass off module 174 and encodes the information in a machine-readable format. Examples of machine-readable code 122 include QR codes and bar codes. The machine-readable code 122 can include one or more of a variety of visual, audio, and audio visual representations of non-text-based data encoding techniques which are not easily readable by a human. In some examples, the encoder may encode the information in a URL which is retrievable by a user.

The encoder 322 includes an algorithm that converts data from an original format and encodes the data into the machine-readable code format. As one example, the encoder 322 includes algorithms to generate a QR code based on one or more machine-readable code standards, such as the ISO/IEC 18004 standards available from the International Organization for Standardization of Geneva Switzerland. Other machine-readable code encoding processes and standards can be used in other embodiments.

Figure 11:
FIG. 11 is an example room editor user interface.

FIGS. 10-12 show example user-interfaces for various example features of a furniture selection system 100, shown in FIG. 1. The example user-interfaces are displayed on the display device 106 as shown in the example furniture selection system 100 in FIG. 1. In some examples, the user interacts with the user-interfaces using a touch screen. In other examples the user interacts with the user-interfaces using various controls connected to the computing device 102.

FIG. 10 is an example room selector user-interface 340. In the example shown, the room selector user-interface 340 contains a current room selection 342, a first room selection navigation button 344A and a second room selection navigation button 344B.

The current room selection shows a predefined room to a user. A user can select the current room. In the example shown the current room contains a predefined set of furniture which may act as a starting point for a user. The user can also navigate a list of predefined rooms by selecting the first room selection navigation button 344A or the second room selection navigation button 344B. Selecting the first room selection navigation button 344A will slide the current room displayed in the user-interface to the next room on the right. Selecting the second room selection navigation button 344B will slide the current room displayed in the user-interface to the next room on the left. In some embodiments all the rooms in the room selector user-interface 340 are predefined rooms with predefined starting points. In other embodiments only some of the predefined rooms have predefined starting points, and in further embodiments a room selection which is fully customizable may be presented.

FIG. 11 is an example room editor user interface 350. The example shown includes a first room 352A a second room 352B. The example shown also includes a selected furniture item 356 and a presentation 354 or the selected furniture item 356. A navigation button 358 is also shown.

In the example shown the first room 352A and the second room 352B are both bedrooms containing bedroom furniture. The first room 352A includes a selected furniture item 356. In the example shown when the furniture item is selected there is a presentation 354 of the selected furniture item 356. The presentation 354 includes details about the item, in this example the details include the price of the selected item. In other examples, a user can move around a selected item in the one or more virtual rooms. A user may also have a catalog of pieces to place in the rooms. In some embodiments, the presentation 354 may include related products that a user may swap for the selected furniture item 356. The navigation button 358 may be used to move the view of user-interface to include another area not shown on the screen. For example, the navigation button 358 may be selected moving the user-interface to include a room not shown on the current display.

FIG. 12 is an example room reviewer user-interface 360. The example shown includes a snapshot 362, a first navigation button 364A, a second navigation button 364B, and a products list 366.

In the example shown the snapshot 362 displays the room at an angle and with lighting. The snapshot presents furniture items in a designed layout. In some examples the snapshots are presented in a slide show which a user can navigate using the first navigation button 364A and the second navigation button 364B. In the example shown the user interface includes a products list 366 displayed in the snapshot 362. This allows a user to quickly review the products displayed in the virtual room.

Figure 13:
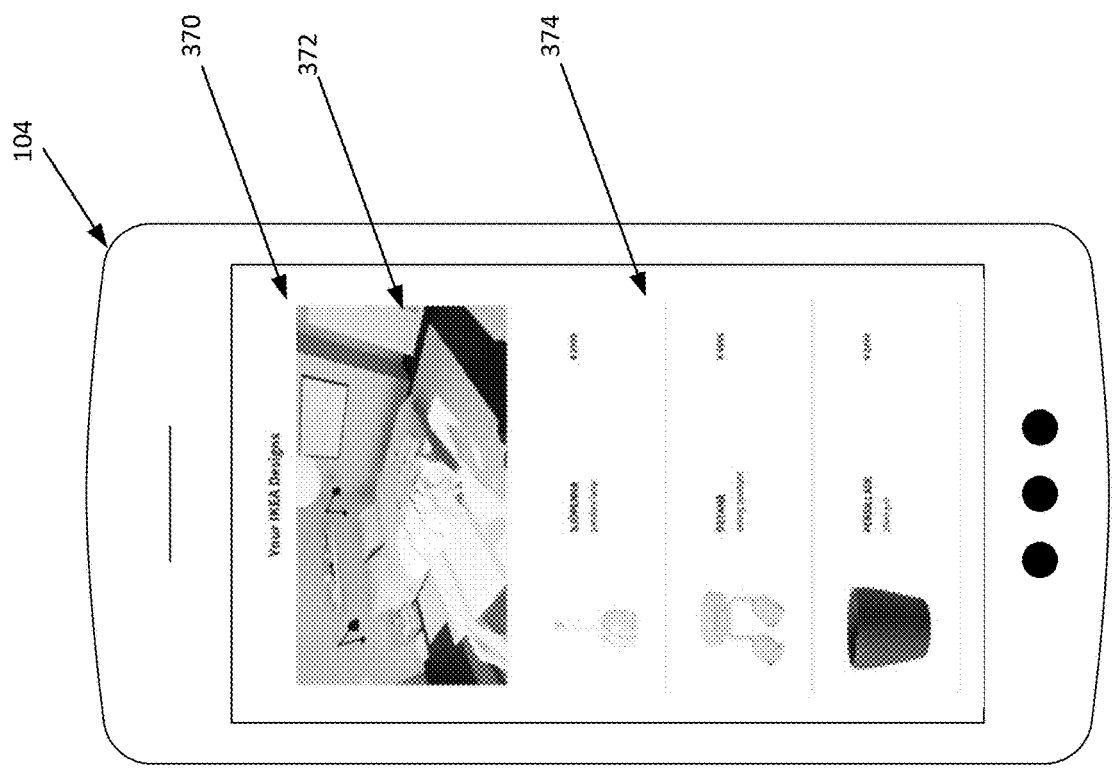
FIG. 13 is a schematic diagram of a user computing device in a furniture selection system.

FIG. 13 is a schematic diagram of a user computing device 104 in a furniture selection system 100. The user computing device 104 shows an example user computing device application 370. The user computing device application 370 includes a snapshot 372 and a list of products 374.

The user computing device 104 includes a user computing device application 370. Further details about the user computing device application 370 are described below in reference with FIG. 14. In the example shown the user computing device application 370 presents a user-interface. The user-interface includes a snapshot 372 of a virtual room. The user interface also includes a list of products 374 which are present in the snapshot. In some examples the user-interface includes the same features described in the example room reviewer user-interface 360, described and illustrated in reference to FIG. 12.

Figure 14:
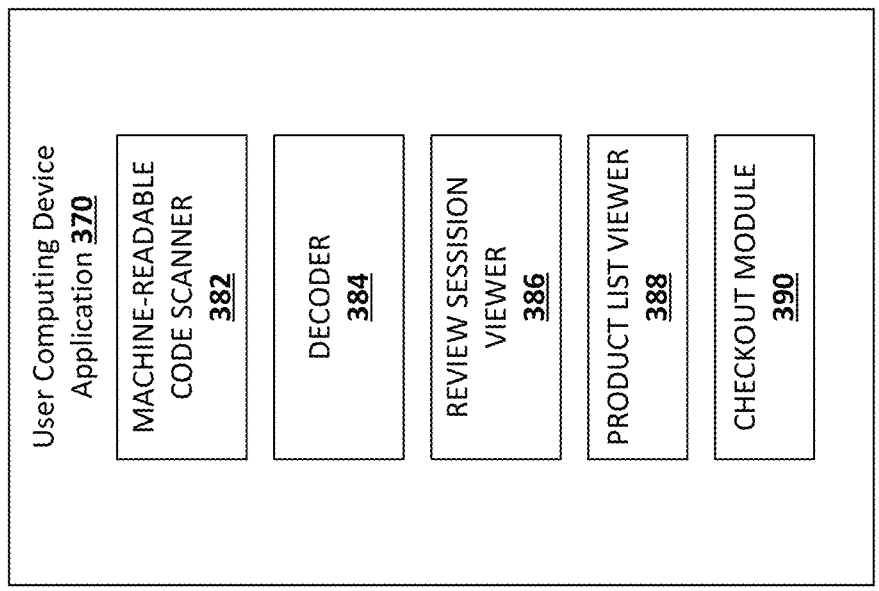
FIG. 14 is a schematic block diagram of the user device application.

FIG. 14 is a schematic block diagram of the user computing device application 370. The user computing device application 370 includes a machine-readable code scanner 382, a decoder 384, a review session viewer 386, a product list viewer 388, and a checkout module 390.

The machine-readable code scanner 382 is used to retrieve a machine-readable code from the display device 106, as shown in the example of FIG. 1. In some examples, the machine-readable code scanner is a camera on a mobile device. The camera picks up the code and provides the image to the decoder. In one example the camera detects and captures a QR code. In other examples, the machine-readable scanner is scanner specifically for reading the machine-readable code. For example, a bar code scanner.

The decoder 384 receives a representation of the machine-readable code from the machine-readable code scanner 382. The decoder receives the image and decodes the machine-readable code into a format which is useable by the user computing device application 370. An example of the decoder is further illustrated and described in FIG. 18.

In some examples, the user device application includes a review session viewer 386. The review session viewer 386 can generate a user-interface to display one or more snapshots of one or more virtual rooms which the user designed using the furniture layout designer 108.

The user computing device application 370 includes a product list viewer 388, in some example embodiments. The product list viewer 388 can generate a user-interface for reviewing a list of products present in the user's final design. The list of products can include additional information about each product such as location of the product in a store, price of the product, or inventory details about the product.

The user device application can also include a checkout module 390. The checkout module 390 can prompt the user to complete the purchase of one or more products in the products list. Example methods executable by the checkout module are illustrated and described in reference to FIGS. 16 and 17.

Figure 15:
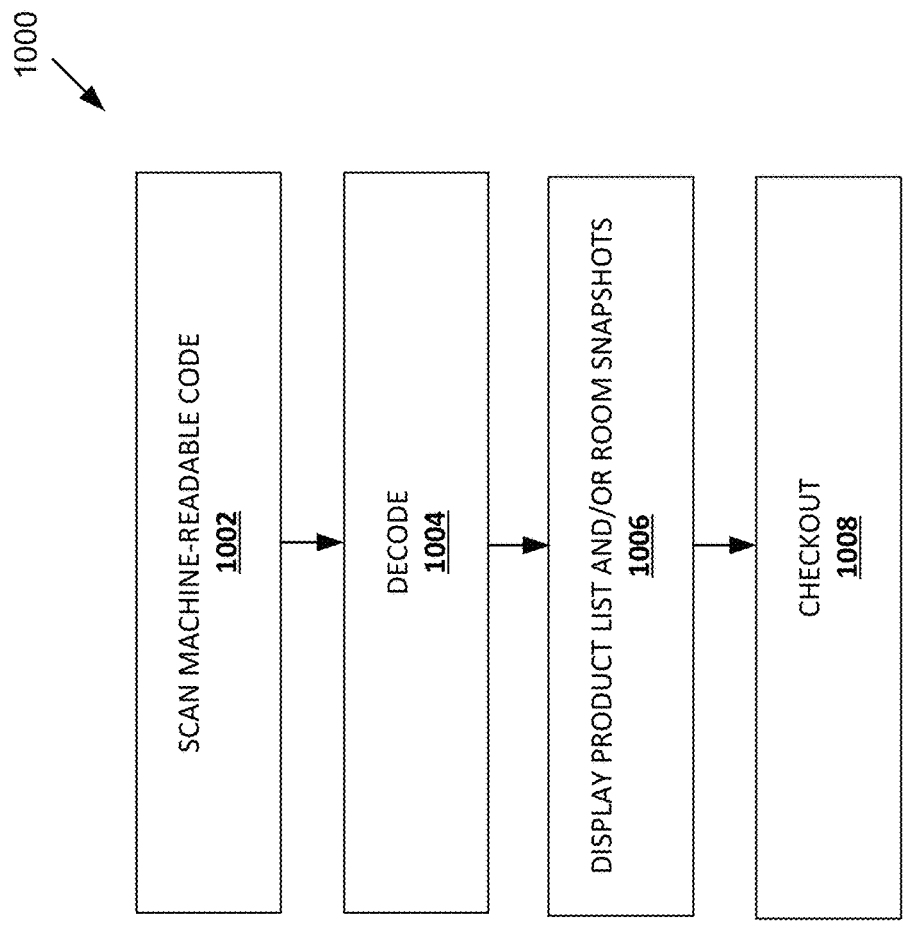
FIG. 15 is a flow chart illustrating an example method of transferring a furniture selection using machine-readable code.

FIG. 15 is a flow chart illustrating an example method 1000 of transferring a furniture selection using machine-readable code. The method 1000 includes the operations 1002, 1004, 1006 and 1008.

In the operation 1002, the user-computing device scans the machine-readable code. In one example, the operation 1002 uses a camera to detect and capture a machine-readable code. In one specific example, the machine-readable code detected and captured is a QR code. Other examples include a bar code.

In the operation 1004, the user computing device decodes the machine-readable code. The operation 1004 the user computing device decodes the detected machine-readable code to provide information for the user computing device application. An example of the operation 1004 is illustrated and described in reference to FIG. 18.

In the operation 1006, the user computing device presents a display which can include a products list and/or room snapshots. An example of such display is shown in the user computing device application 370 illustrated in FIG. 12.

In the operation 1008, the user device checks out an order. Checking out can include prompting the user select one or more products from the products list, enter payment information, and shipping information to complete the purchase of the products. In one example, operation 1008 may provide the user a list of locations within a store or where a customer can pick up products on the products list. More examples of operation 1008 are shown in FIGS. 16-17.

Figure 16:
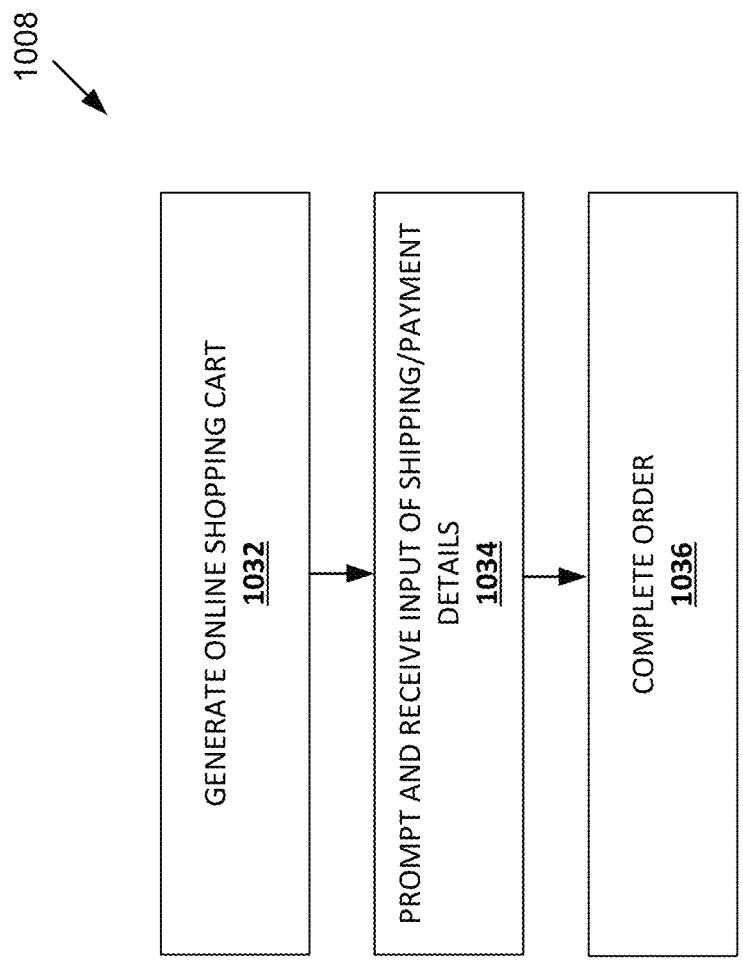
FIG. 16 is a flowchart illustrating an example method for checking out an order using a user device application.
Figure 17:
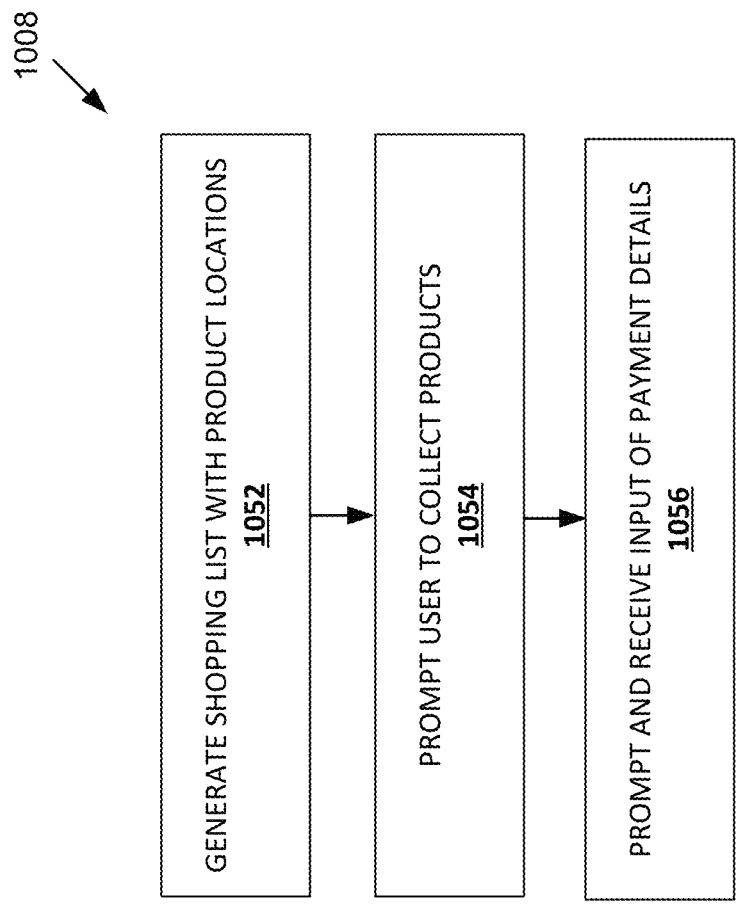
FIG. 17. is a flowchart illustrating an example method for checking out an order using a user device application.

FIGS. 16 and 17 are flowcharts illustrating example methods for checking out and are additional examples of the operation 1008, as shown in FIG. 15.

FIG. 16 is a flowchart illustrating an example method for checking out using a user computing device application 370 and is another example of the operation 1008 which is shown in FIG. 15. The method 1008 includes the operations 1032, 1034, and 1036.

In the operation 1032, the user computing application generates an online shopping cart. The online shopping cart can include one or more products from the products list. In one example, the operation 1032 automatically puts each product in the product list in the shopping cart. In another example of the operation 1032 a user selects the products from the products list to add to the shopping cart.

In the operation 1034, the user computing application generates a display to prompt and receive the user input of shipping and payment details. The operation 1034 can include any of wide verity of systems which receive payment details for an online order.

The operation 1036 completes the order. Completing the order includes processing the payment information and scheduling a delivery for the associated products.

FIG. 17 is a flowchart illustrating an example method 1008 for checking out using a user computing device application 370 and is another example of the operation 1008 as shown in FIG. 15. The method 1008 includes the operations 1052, 1054, and 1056.

The operation 1052 generates a shopping list with product locations inside a store. In one example the operation 1052 automatically generates a shopping list with the location of all the products in a user's design. In another example a user selects items from the products list to include in the shopping list. The shopping list includes the locations of the products in a store and/or warehouse. In one example, the shopping list includes where the product is on display and where the product may be found in a warehouse.

The operation 1054 prompts the user to collect the products. The operation 1054 may visually our audibly direct the user to locations where the products are found. In one example the operation 1054 may prompt the user to view where the products are on display and then to a location where the user can pick up the products.

The operation 1056 prompts and receives input of payment details. In some embodiments this step includes completing an order after the customer has collected all of the products. In other examples, this operation may prompt a user to a cashier which receives the order and processes the payment.

Figure 18:
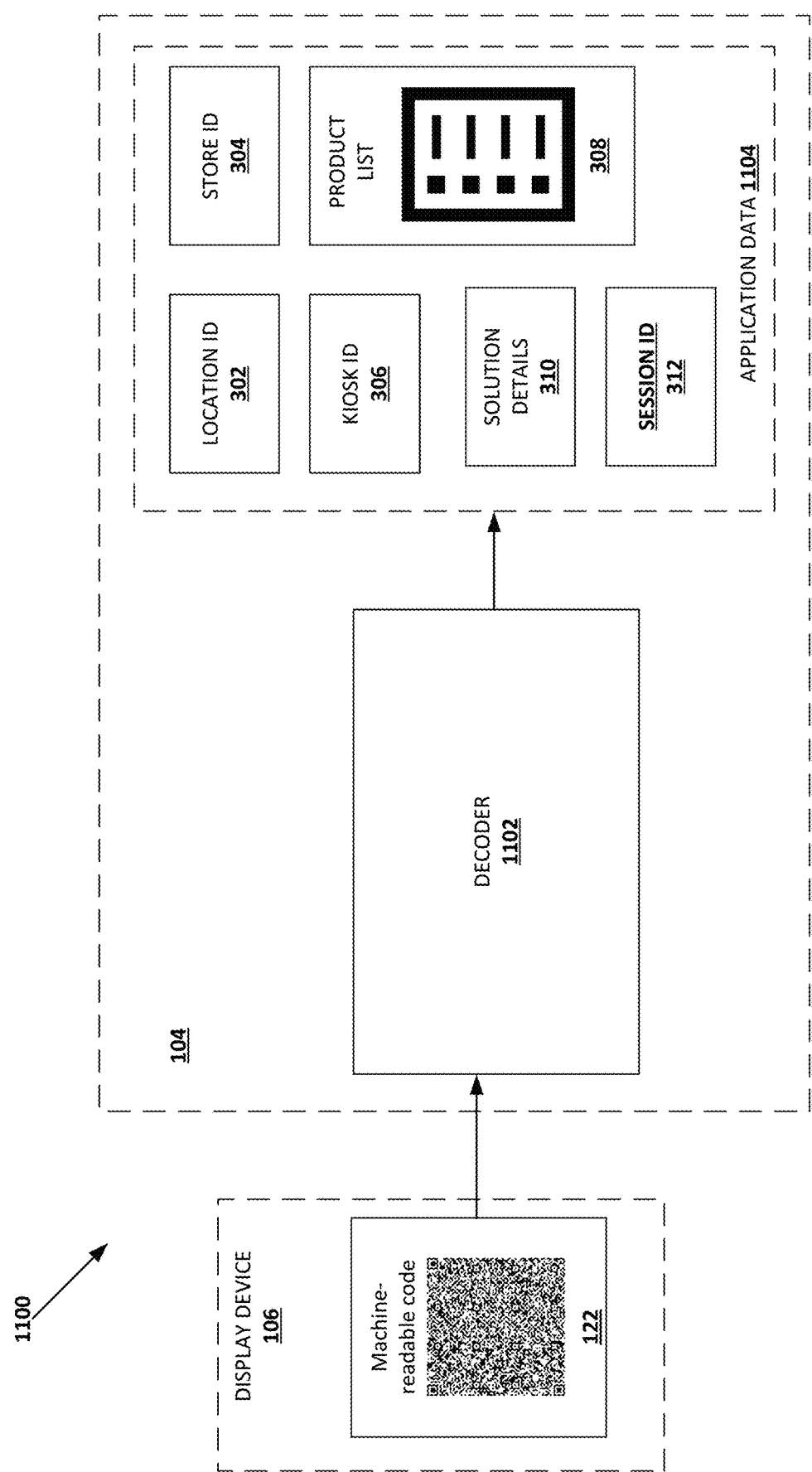
FIG. 18 is a schematic diagram showing a system for a user computing device receiving a furniture design session.

FIG. 18 is a schematic diagram showing a system 1100 for a user computing device 104 receiving and decoding a machine-readable code from a display device 106. The system includes a display device 106, a user computing device 104. The display device 106 presents a machine-readable code 122. The user computing device 104 includes a decoder 384 which generates application data 1104. In some examples application data 1104 can include location ID 302, a store ID 304, a kiosk ID 306, a products list 308, solution details 310, and a session ID 312. The machine-readable code generator 110 includes an encoder 322 and a machine-readable code 122.

The display device 106 is another example of the display device 106 as shown in FIG. 1. The display device presents a machine-readable code 122. In some examples, the machine-readable code is generated by a machine-readable code generator 110 as illustrated and described in FIG. 9.

The decoder 1102 decodes the machine-readable code 122. The decoder may be a software module which receives a detected machine-readable code and extracts information into a format which is usable by computing device application. In some examples the decoder 1102 will extract the information into one or more data structures which are usable by a user computing device application 370, shown in FIG. 19. The decoder can utilize an algorithm that corresponds to the encoder algorithm. In one example, the decoder algorithm decodes a QR code based on one or more machine-readable code standards, such as the ISO/IEC 18004 standards available from the International Organization for Standardization of Geneva Switzerland. Other machine-readable code decoding processes and standards can be used in other embodiments.

The application data 1104 is any data from the furniture layout designer 108, which is designed to hand off a session to the user computing device 104. The application data 1104 can include the same information which is compiled by the session pass off module 174, which is illustrated and described above with FIG. 8. In some examples the application data contains no personal information about the user. In these examples the user can remain completely anonymous until the user decides to complete the transaction on the user computing device 104.

In the example shown the application data includes location ID 302, a store ID 304, a kiosk ID 306, a products list 308, solution details 310, and a session ID 312. More details about the example data is illustrated and described in FIG. 9.

Figure 19:
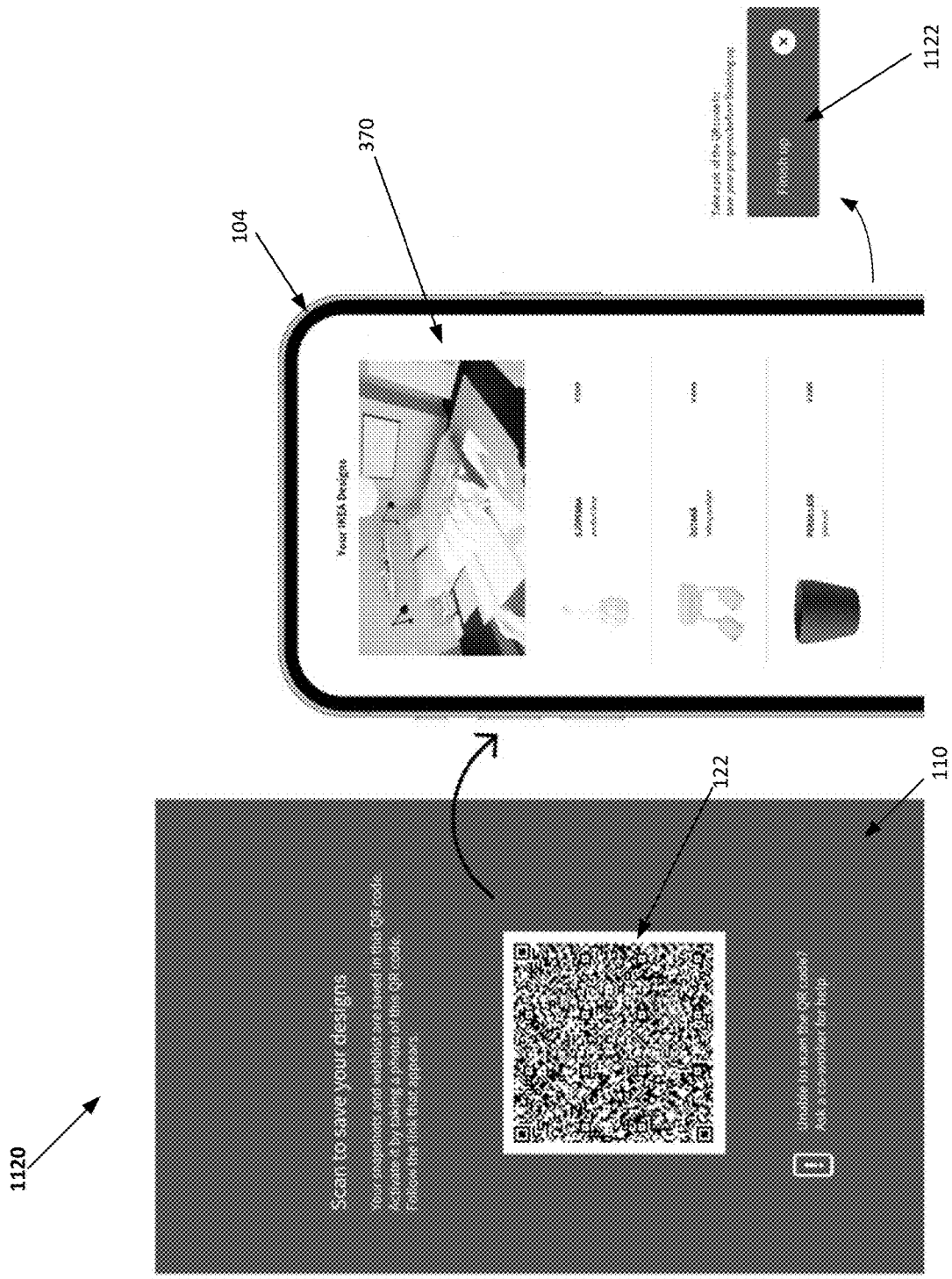
FIG. 19 is a schematic diagram showing a system for a user computing device receiving a furniture design session.

FIG. 19 is diagram of a system 1120 for a mobile device receiving a machine-readable code 122. The system 1120 includes a machine-readable code generator 110 which presents a machine-readable code 122. A user computing device 104 which receives the machine-readable code 122 and presents a user computing device application 370. In some embodiments the system can include a complete session element 1122 which is presented on a display device 106 and triggers the session pass off module 174 when selected by a user. An example of a user device receiving and decoding a machine-readable code is described and illustrated in FIG. 18.

Figure 20:
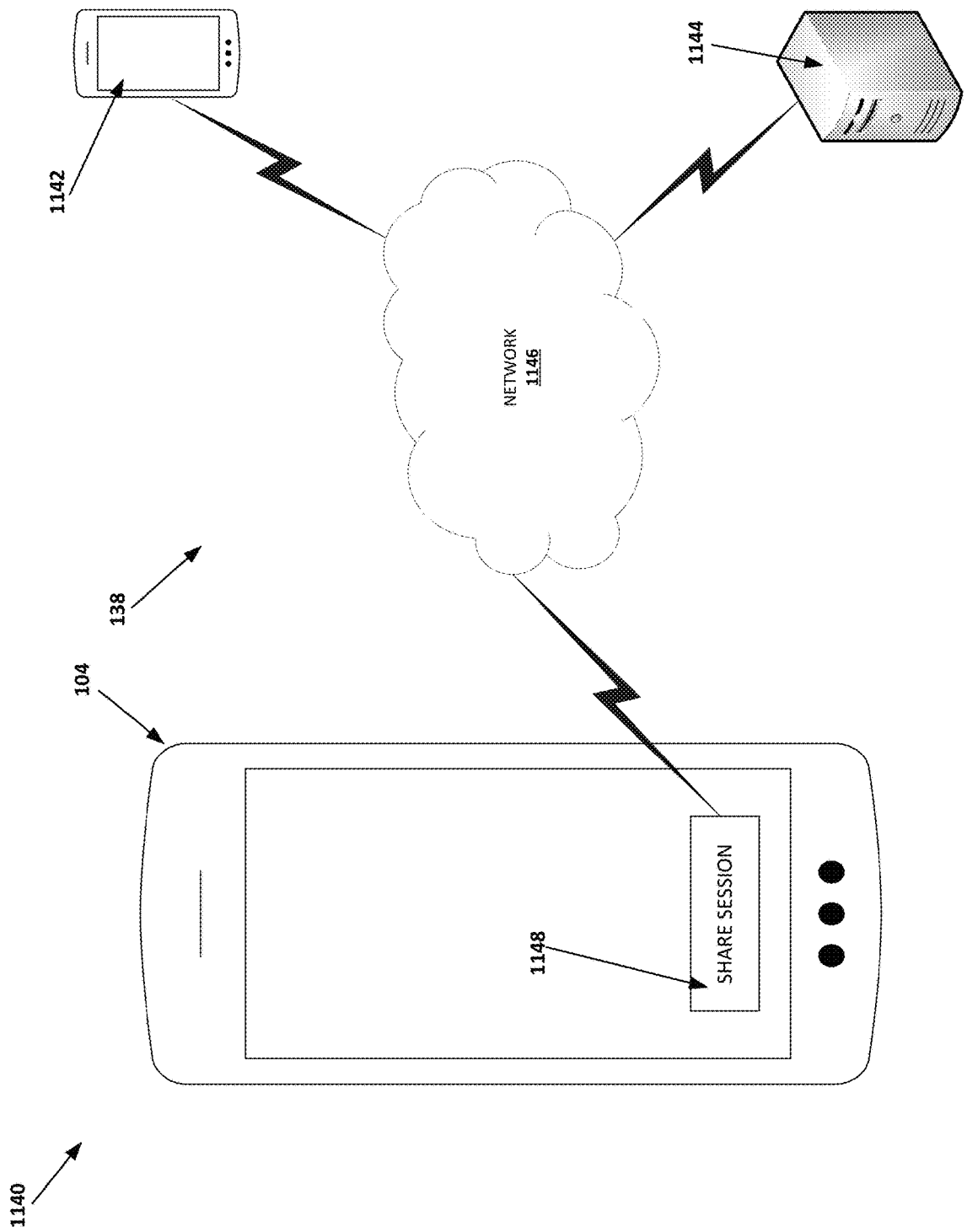
FIG. 20 is a schematic block diagram of a mobile computing device in a network system.

FIG. 20 is a schematic block diagram of a user computing device 104 in a network system 138. In this example the user computing device 104 is connected to a network system including a network 1146. Through the network 1146 the user computing device 104 is connected to a second user computing device 1142 and a server 1144. The user computing device 104 includes a share session module 1148.

In some examples, the user computing device 104 is the user computing device 104 described in FIG. 1. In the example shown the user computing device 104 can share a session using the share session module 1148. In some examples, a user may wish to share a session with friends, family, or a professional designer to receive feedback. In other examples the user computing device 104 may be used by an employee who sends the session to a customer after completing a session. In other examples the transfer from the user computing device 104 to the second user computing device 1142 involves the user computing device encoding a machine-readable code and the second user computing device 1142 decoding the machine-readable code.

In the example shown the second user computing device 1142 receives a design session from the user computing device 104 through the network 1146. In another example the second user computing device 1142 receives a design session from a machine-readable code which is generated on the user computing device 104. In some examples the user interface displayed on the second user computing device 1142 is the user-interface shown in the example of FIG. 13.

In some embodiments the user computing device 104 is connected to a server 1144. The server 1144 can provide information and images to the user computing device 104. For example, the server may contain images which are associated with products. A user computing device 104 may decode a list of product IDs which it uses to request the associated images from the server 1144.

In another example, the user computing device 104 receives a session ID encoded in a machine-readable code. The user computing device then sends a request to the server 1144 which provides the session details to the user computing device 104. In this example the session details may be uploaded to the server 1144 from the kiosk 140 as shown in the example of FIG. 2.

The server 1144 can also receive and track information about various sessions and use this information to generate predictions about products and designs which consumers select or may wish to select in the future. The server can also track information to make insights about different products and insights on employees assisting customers. For example, employees can gain insight about whether assisted sessions result in higher average order values.

The network 1146 can be any communication network, such as the internet, local area network, wide area network, cellular telephone network, or other data communication network.

Figure 21:
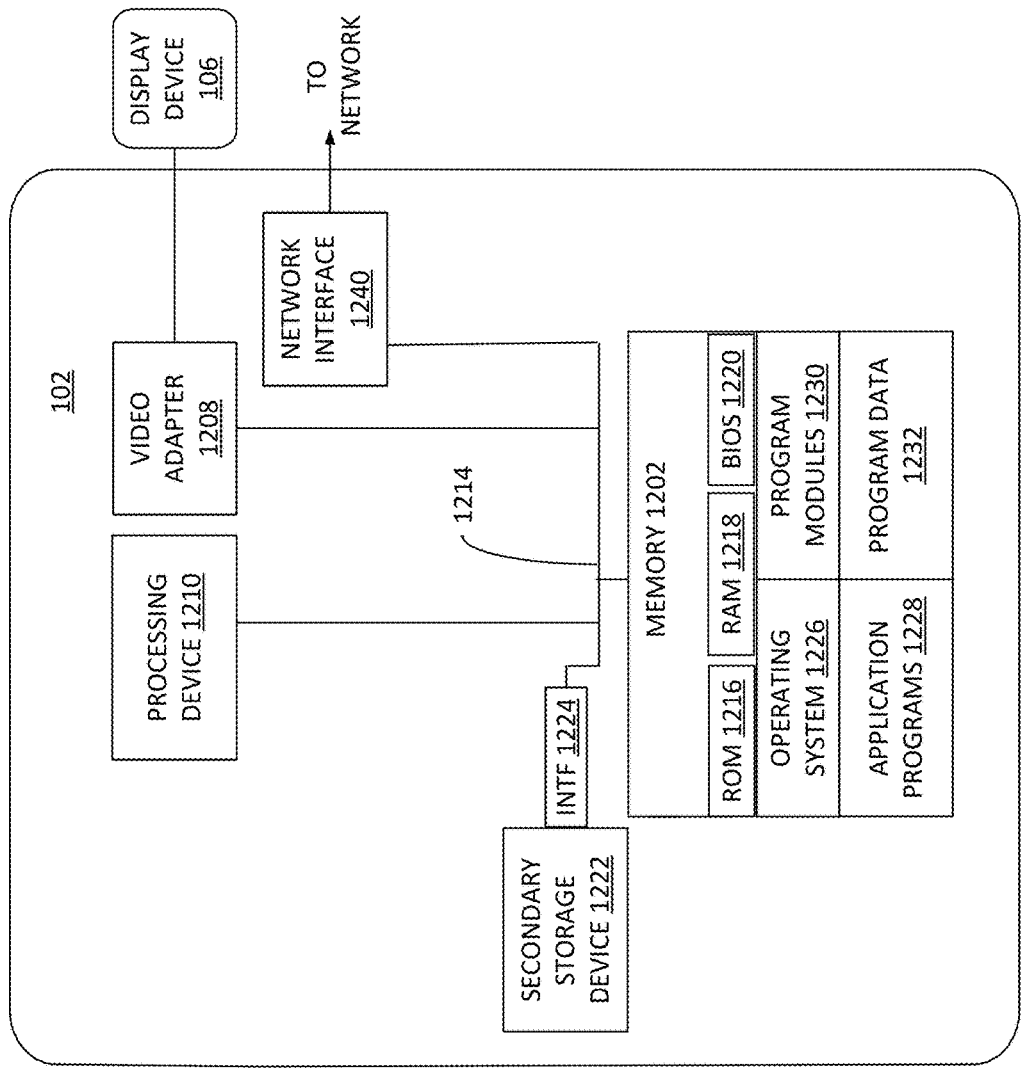
FIG. 21 illustrates an exemplary architecture of a computing device.

FIG. 21 illustrates an exemplary architecture of a computing device that can be used to implement aspects of the present disclosure, including any of the plurality of computing devices described herein. The computing device illustrated in FIG. 21 can be used to execute the operating system, application programs, and software described herein. By way of example, the computing device will be described below as computing device 102 of the furniture selection system 100 shown in FIG. 1. To avoid undue repetition, this description of the computing device will not be separately repeated herein for each of the other computing devices, including the user computing device 104 as shown in FIG. 1 as well as the second user computing device 1142 and the server 1144 shown in FIG. 20, but such devices can also be configured as illustrated and described with reference to FIG. 21.

Examples of computing devices suitable for the computing device 102 include a desktop computer, a laptop computer, a tablet computer, a mobile computing device (such as a smartphone, an iPod® or iPad® mobile digital device, or other mobile devices), a computing device coupled with a kiosk, or other devices configured to process digital instructions.

The system memory 1202 includes read only memory 1216 and random access memory 1218. A basic input/output system 1220 containing the basic routines that act to transfer information within computing device 102, such as during start up, is typically stored in the read only memory 1216.

The computing device 102 also includes a secondary storage device 1222 in some embodiments, such as a hard disk drive, for storing digital data. The secondary storage device 1222 is connected to the system bus 1214 by a secondary storage interface 1224. The secondary storage devices 1222 and their associated computer readable media provide nonvolatile storage of computer readable instructions (including application programs and program modules), data structures, and other data for the computing device 102.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 1222 or memory 1202, including an operating system 1226, one or more application programs 1228, other program modules 1230 (such as the software described herein), and program data 1232. The computing device 102 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides input to the computing device 102 through one or more input devices. Examples of input devices include a keyboard, mouse, microphone, and touch sensor (such as a touchpad or touch sensitive display). Other embodiments include other input devices. The input devices are often connected to the processing device 1210 through an input/output interface that is coupled to the system bus 1214. These input devices can be connected by any number of input/output interfaces, such as a parallel port, serial port, game port, or a universal serial bus. Wireless communication between input devices and the interface is possible as well, and includes infrared, BLUETOOTH® wireless technology, 802.11a/b/g/n, cellular, or other radio frequency communication systems in some possible embodiments.

In this example embodiment, a display device 106, such as a monitor, liquid crystal display device, projector, or touch sensitive display device, is also connected to the system bus 1214 via an interface, such as a video adapter 1208. In addition to the display device 106, the computing device 102 can include various other peripheral devices (not shown), such as speakers or a printer.

When used in a local area networking environment or a wide area networking environment (such as the Internet), the computing device 102 is typically connected to the network through a network interface 1240, such as an Ethernet interface. Other possible embodiments use other communication devices. For example, some embodiments of the computing device 102 include a modem for communicating across the network.

The computing device 102 typically includes at least some form of computer readable media. Computer readable media includes any available media that can be accessed by the computing device 102. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 102.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 21 is also an example of programmable electronics, which may include one or more such computing devices, and when multiple computing devices are included, such computing devices can be coupled together with a suitable data communication network so as to collectively perform the various functions, methods, or operations disclosed herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A kiosk system comprising:
a kiosk housing;
a display device coupled to the kiosk housing and visible from outside of the kiosk housing; and
a computing device contained in the kiosk housing and including a memory storage device, the memory storage device storing instructions that, when executed by the computing device, cause the computing device to:
generate and display on the display device a graphical user interface for a furnishing selector application;
receive, within the graphical user interface, an input from a user selecting a room from a list of rooms, the selected room including a predefined set of furnishings positioned in the selected room;

receive, within the graphical user interface, inputs from the user selecting furnishings from a list of furnishings and positioning the selected furnishings in the selected room;

generate a list of products identifying at least one furnishing from the predefined set of furnishings positioned in the selected room or at least one furnishing selected by the user from the list of furnishings;

generate a machine-readable code encoding the generated list of products; and display the machine-readable code on the display device such that the machine-readable code is scannable by a camera of a user device to transfer the list of products to the user device from the kiosk system.

2. The kiosk system of claim 1, wherein the instructions, when executed by the computing device, further cause the computing device to:

look up product identifiers associated with each of the selected furnishings; and encode the product identifiers in the machine-readable code.

3. The kiosk system of claim 1, wherein the instructions, when executed by the computing device, further cause the computing device to:

generate a session identification number; and encode the session identification number in the machine-readable code.

4. The kiosk system of claim 3, wherein the instructions, when executed by the computing device, further cause the computing device to:

upload the list of products and the session identification number to a web service, wherein the web service allows the user to retrieve the list of products at a user computing device using the session identification number.

5. The kiosk system of claim 1, wherein the furnishing selector application includes:

an interface which allows the user to initiate a session;

a room editor configured to receive inputs from the user to:

edit characteristics of the selected room; and edit characteristics of the predefined set of furnishings positioned in the selected room or at least one furnishing selected by the user from the list of furnishings;

a room reviewer which displays the selected room in one or more snapshots; and a session pass off module which compiles session details to encode in the machine-readable code.

6. The kiosk system of claim 5, wherein the session details further include:

a store identifier associated with a store the kiosk system is located in;

a kiosk identifier associated with the kiosk system;

a session identifier associated with the session; and a list of product identifiers associated with each of the predefined set of furnishings positioned in the selected room and at least one furnishing selected by the user from the list of furnishings.

7. The kiosk system of claim 1, wherein the kiosk system does not receive personal information about the user.

8. The kiosk system of claim 1, wherein the instructions, when executed by the computing device, further cause the computing device to:

display within the graphical user interface, the selected room including the predefined set of furnishings and the selected furnishings positioned in the selected room;

receive, within the graphical user interface, inputs from the user changing lighting for the selected room according to time of the day and changing arrangement of lighting sources in the selected room; and update the displayed room based on the inputs changing the lighting for the selected room and the changing arrangement of lighting sources.

9. The kiosk system of claim 1, wherein generating the machine-readable code includes encoding, directly into the machine-readable code, location identification of the kiosk system, identification of store associated with the kiosk system, and identification of a session during which the inputs for selecting the room, for selecting the furnishings, for positioning the furnishing are received.

10. The kiosk system of claim 1, wherein the computing device includes an encoder configured to encode, into the machine-readable code, a product identifier for each of the products in the generated list of products.

11. A method of transferring selected products from a kiosk, the method comprising:

generating, by a kiosk computing device contained within the kiosk having a kiosk display device, and displaying, on the kiosk display device electronically connected to the kiosk computing device, a graphical user interface for a furnishing selector application;

receiving, within the graphical user interface, an input from a user selecting a room from a list of rooms, the selected room including a predefined set of furnishings positioned in the selected room;

receiving, within the graphical user interface, inputs from the user selecting furnishings from a list of furnishings and positioning the selected furnishings in the selected room;

generating, by the kiosk computing device, a list of products identifying at least one furnishing from the predefined set of furnishings positioned in the selected room or at least one furnishings selected by the user from this list of furnishings;

encoding, by the kiosk computing device, the generated list of products into a machine-readable code; and displaying, on the kiosk display device, the machine-readable code such that the machine-readable code is scannable by a camera of a user device to transfer the list of products to the user device from the kiosk.

12. The method of claim 11, the method further comprising:

looking up, by the kiosk computing device, product identifiers associated with each of the selected furnishings; and encoding, by the kiosk computing device, the product identifiers in the machine-readable code.

13. The method of claim 12, the method further comprising: generating, by the kiosk computing device, a session identification number; and encoding, by the kiosk computing device, the session identification number in the machine-readable code.

14. The method of claim 13, wherein the list of products and the session identification number are uploaded to a web service which allows the user device to retrieve the list of products using the session identification number.

15. The method of claim 11, the method further comprising: initiating, by the kiosk computing device, a session;

receiving, at the kiosk computing device, inputs for:
   editing characteristics of the selected room; and editing characteristics of the predefined set of furnishings positioned in the selected room or at least one furnishing selected by the user from the list of furnishings;
   reviewing the selected room in one or more snapshots; and
   passing off session details to encode in the machine-readable code.

16. The method of claim 15, wherein the session details include: a store identifier associated with a store the kiosk is located in;
   a kiosk identifier associated with the kiosk;
   a session identifier associated with the session; and
   a list of product identifiers associated with each of the predefined set of furnishings positioned in the selected room and at least one furnishing selected by the user form the list of furnishings.

17. The method of claim 11, wherein no personal information about the user is received.

18. They method of claim 11, wherein the machine-readable code is not associated with a web resource.

19. The method of claim 11, whereby the machine-readable code is scannable by a camera of the user computing device to transfer the list of products to the user computing device.

20. A kiosk comprising: a kiosk housing;
   a display device coupled to the kiosk housing and visible from outside of the kiosk of the kiosk housing; and
   a computing device contained in the kiosk housing and including a memory storage device, the memory storage device storing instructions that, when executed by the computing device, cause the computing device to:
      generate and display on the display device a graphical user interface for a furniture selector application;
      receive, within the graphical user interface, inputs from a user selecting a room representing a scene, the scene including a predefined set of furnishings positioned in the selected room;
      receive, within the graphical user interface, inputs from the user selecting furnishings from a list of furnishings retrieved from a remote database storing information on furnishings available in a store associated with the kiosk and inputs positioning the selected furnishings in the selected room;
      display, within the graphical user interface, the scene including the predefined set of furnishings and the selected furnishings positioned in the selected room;
      receive, within the graphical user interface, inputs from the user editing characteristics of the furnishings selected by the user;
      receive, within the graphical user interface, inputs from the user editing lighting settings of the scene;
      update the displayed scene based on the edited characteristics of the furnishings and the edited lighting settings of the scene;
      in response to receiving an input selecting a furnishing included in the displayed scene, display, in an overlapping manner over a portion of the scene, information about the selected furnishing, the information including a name and a price of the selected furnishing;
      generate a list of products including the predefined set of furnishings and the selected furnishings positioned in the selected room;
      generate a machine-readable code encoding the generated list of products; and
      display the generated machine-readable code on the display device such that the machine-readable code is scannable by a camera of a user device to transfer the generated list of products to the user device,
   wherein the list of products and the displayed machine-readable code are updated as inputs from the user are received for editing characteristics of the furnishings selected by the user.

21. A method, the method comprising:
   generating, by a kiosk computing device contained within the kiosk having a kiosk display device, and displaying, on the kiosk display device electronically connected to the kiosk computing device, a graphical user interface for a furniture selector application;
   receiving, within the graphical user interface, inputs from a user selecting a room representing a scene, the scene including a predefined set of furnishings positioned in the selected room;
   receiving, within the graphical user interface, inputs from the user selecting furnishings from a list of furnishings retrieved from a remote database storing information on furnishings available in a store associated with the kiosk and inputs positioning the selected furnishings in the selected room;
   displaying, within the graphical user interface, the scene including the predefined set of furnishings and the selected furnishings positioned in the selected room;
   receiving, within the graphical user interface, inputs from the user editing characteristics of the furnishings selected by the user;
   receiving, within the graphical user interface, inputs from the user editing lighting settings of the scene;
   updating the displayed scene based on the edited characteristics of the furnishings and the edited lighting settings of the scene;
   in response to receiving an input selecting a furnishing included in the displayed scene, display, in an overlapping manner over a portion of the scene, information about the selected furnishing, the information including a name and a price of the selected furnishing;
   generating, by the kiosk computing device, a list of products including the predefined set of furnishings and the selected furnishings positioned in the selected room;
   generating, by the kiosk computing device, a machine-readable code encoding the generated list of products; and
   displaying, on the kiosk display device, the generated machine-readable code device such that the machine-readable code is scannable by a camera of a user device to transfer the generated list of products to the user device,
   wherein the list of products and the displayed machine-readable code are updated as inputs from the user are received for editing characteristics of the furnishings selected by the user.

* * * * *